Figure 1:
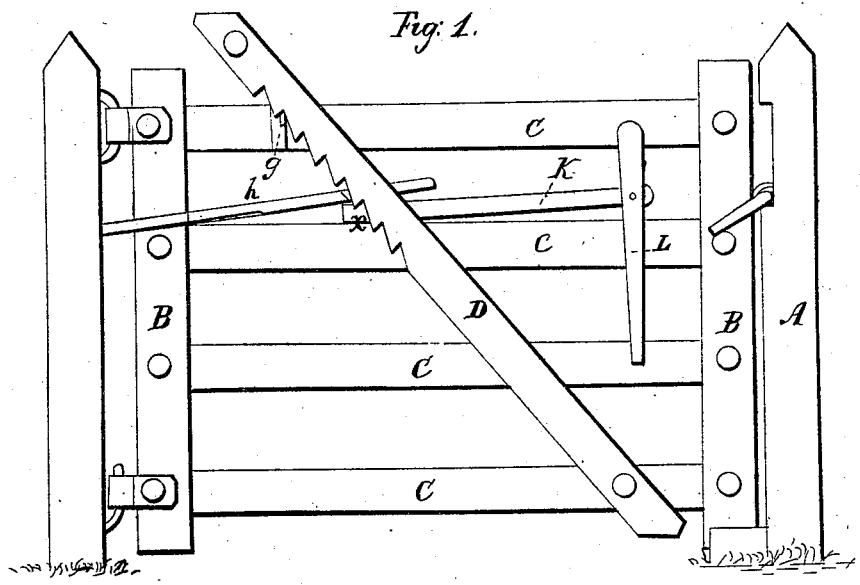

J. ADAMS.
Gate.

No. 77,564.

Patented May 5, 1868.

Witnesses:

Inventor
John Adams
per Alexander Mann
attys

UNITED STATES PATENT OFFICE.

JOHN ADAMS, OF PONTIAC, MICHIGAN.

IMPROVEMENT IN GATES.

Specification forming part of Letters Patent No. 77,564, dated May 5, 1868.

*To all whom it may concern:*

Be it known that I, JOHN ADAMS, of Pontiac, in the county of Oakland, and in the State of Michigan, have invented certain new and useful Improvements in Gates; and I do hereby declare that the following is a full, clear, and exact description thereof, reference being had to the accompanying drawings, and the letters of reference marked thereon.

In the annexed drawings, making a part of this specification, A A represent gate-posts planted or set in the ground at suitable distance apart, and B B represent the end rails, and $c\ c$ the slats, of a gate hinged to one of said posts A. The slats $c\ c$ are pivoted between the end rails, B B, so as to rise or fall, as may be desired.

D represents a brace composed of two slats pivoted outside of and to the bottom of the front end of the gate, and extends diagonally up and back across the gate, as seen in the drawings. Each of the slats composing the brace D is provided with a series of ratchet-teeth, which catch over a pin, $g$, in the top slat, $c$, and thereby hold the front end of the gate at any elevation desired, so that said gate will swing over ordinary obstacles and may be set so that hogs or sheep may pass beneath it, while it prevents the passage of larger animals.

L represents a handle or lever pivoted to the top slat of the gate and hanging down on each side of the slats $c\ c$. Pivoted between the sides of the lever L, and extending along on one of the slats $c\ c$, between the sides of the brace D, is a bar or rod, K, which is provided with a shoulder, or has a pin, $x$, extending through it.

The teeth of the brace D are detached or unhooked from the catch $g$, by means of the lever L and bar K, whenever it may be desired to drop the front end of the gate when open or shut.

Figure 2:
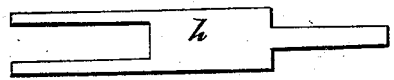

$h$ represents a bar made forked at one end and narrow at the other, as shown in Fig. 2. The forked end of the bar $h$ embraces or fits around the end rail, B, and the narrow end fits between the parts of the brace D.

As the gate swings open, the fork of the bar $h$ strikes against the post A, and the shoulder thereof throws the brace D out of lock with the catch $g$, so that the front end of the gate will fall as soon as fully open, thereby saving the trouble of following the gate around and fastening it, in order to have it remain open.

Having thus fully described my invention, what I claim as new, and desire to secure by Letters Patent, is—

1. The bar $h$, when used in combination with a gate, for the purpose of automatically detaching the teeth of the brace D and thereby dropping the front end of said gate, as herein fully set forth.

2. The combination of the bar K, provided with a catch or pin, $x$, with the lever L, when both are arranged as and for the purpose specified.

3. The arrangement of the brace D, catch $g$, bars $h$ and K, lever L, and a farm-gate, the several parts being constructed and operating substantially as and for the purpose set forth.

In testimony that I claim the foregoing I have hereunto set my hand and seal, this 26th day of March, 1868.

JOHN ADAMS. [L. S.]

Witnesses:
PETER HOGAN,
J. A. CORBIN.